United States Patent
Wang et al.

(10) Patent No.: US 9,413,592 B2
(45) Date of Patent: Aug. 9, 2016

(54) LINKAGE POLICY IMPLEMENTATION METHOD AND APPARATUS, OPEN PLATFORM BOARD, AND DEVICE

(71) Applicant: Huawei Technologies Co., Ltd., Shenzhen, Guangdong (CN)

(72) Inventors: Yungui Wang, Nanjing (CN); Fuqing Sun, Nanjing (CN); Yan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 13/962,603

(22) Filed: Aug. 8, 2013

(65) Prior Publication Data
US 2013/0326045 A1    Dec. 5, 2013

Related U.S. Application Data

(63) Continuation of application No. PCT/CN2011/072812, filed on Apr. 14, 2011.

(51) Int. Cl.
*G06F 15/173* (2006.01)
*H04L 12/24* (2006.01)
(Continued)

(52) U.S. Cl.
CPC ............. *H04L 41/00* (2013.01); *H04L 41/022* (2013.01); *H04L 41/0226* (2013.01);
(Continued)

(58) Field of Classification Search
CPC .. H04L 41/0213; H04L 41/0893; H04L 69/08
USPC ........................................................ 709/223
See application file for complete search history.

(56) References Cited

U.S. PATENT DOCUMENTS

| 7,283,533 B1 | 10/2007 | Kumar et al. |
| 2008/0059406 A1 | 3/2008 | Balestriere et al. |

(Continued)

FOREIGN PATENT DOCUMENTS

| CN | 1487700 A | 4/2004 |
| CN | 1863093 A | 11/2006 |

(Continued)

OTHER PUBLICATIONS

Chinese Search Report in corresponding Chinese Patent Application No. 201180003894 (Sep. 24, 2012).
(Continued)

*Primary Examiner* — Wing F Chan
*Assistant Examiner* — Andrew Woo
(74) *Attorney, Agent, or Firm* — Leydig, Voit & Mayer, Ltd.

(57) ABSTRACT

Embodiments of the present invention disclose a linkage policy implementation method, which includes: receiving, by a linkage proxy module, a linkage policy request delivered by a third-party application service; calling a corresponding protocol converter according to a protocol identifier in the linkage policy request, and performing protocol conversion for the linkage policy request to convert it into a linkage policy request in a set protocol format; and sending the protocol-converted linkage policy request to a linkage client to instruct the linkage client to parse the linkage policy request based on the set protocol and execute linkage policy configuration. With the present invention, a linkage proxy is set to execute protocol conversion of various protocols. Therefore, the cost of the linkage client would not be increased for supporting multiple protocols; and when third-party applications are increased or decreased, it is unnecessary to reconfigure the linkage client.

12 Claims, 13 Drawing Sheets

(51) Int. Cl.
*H04L 29/06* (2006.01)
*H04L 29/08* (2006.01)

(52) U.S. Cl.
CPC ........... *H04L 41/0893* (2013.01); *H04L 63/20* (2013.01); *H04L 67/20* (2013.01); *H04L 69/08* (2013.01); *H04L 69/22* (2013.01); *H04L 41/0213* (2013.01)

(56) References Cited

U.S. PATENT DOCUMENTS

| | | | |
|---|---|---|---|
| 2008/0126520 A1* | 5/2008 | Werber | H04L 41/022 709/221 |
| 2010/0162205 A1 | 6/2010 | Clemm et al. | |
| 2011/0131338 A1* | 6/2011 | Hu | H04W 76/02 709/229 |

FOREIGN PATENT DOCUMENTS

| | | |
|---|---|---|
| CN | 1885788 A | 12/2006 |
| CN | 101094104 A | 12/2007 |
| CN | 101316196 A | 12/2008 |
| CN | 101815008 A | 8/2010 |
| WO | WO 0147207 A2 | 6/2001 |

OTHER PUBLICATIONS

International Search Report in corresponding PCT Patent Application No. PCT/CN2011/072812 (Jan. 19, 2012).

Zhou et al., "Technology of Endpoint Admission Control in Computer Networks," Graduate School of Chongqing Communication Institute, China Academic Journal Electronic Publishing House (Jan. 31, 2011).

* cited by examiner

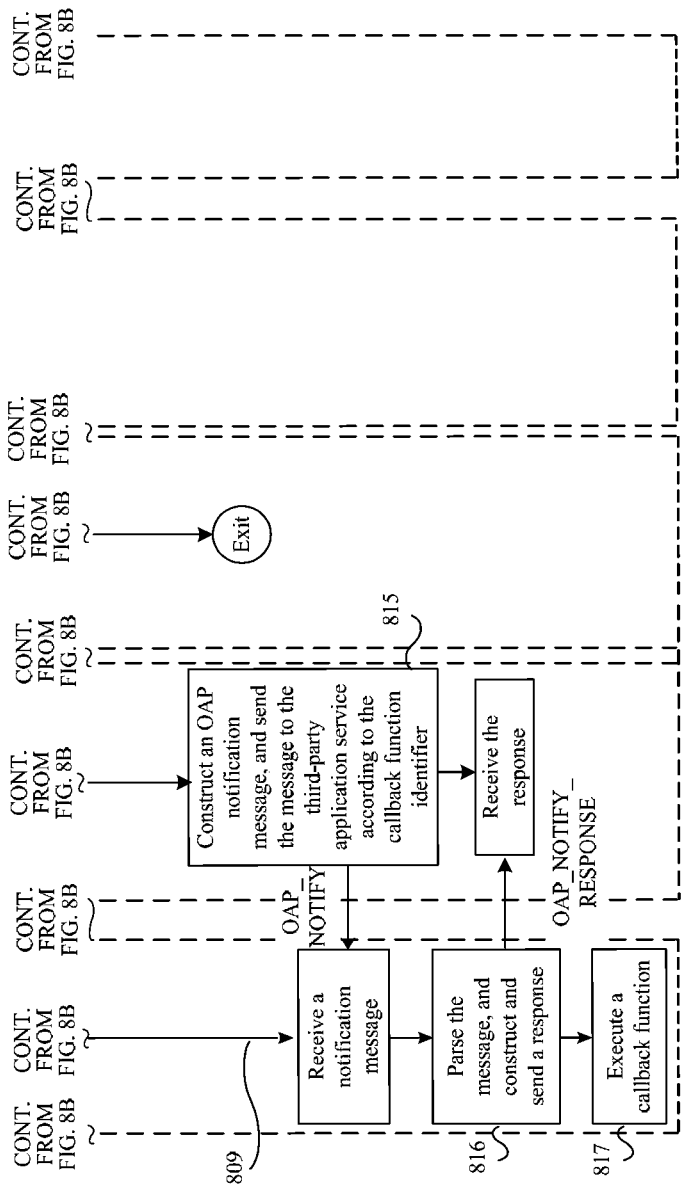

LINKAGE POLICY IMPLEMENTATION METHOD AND APPARATUS, OPEN PLATFORM BOARD, AND DEVICE

CROSS-REFERENCE TO RELATED APPLICATION

This application is a continuation of International Patent Application No. PCT/CN2011/072812, filed on Apr. 14, 2011, which is hereby incorporated by reference in its entirety.

FIELD

Embodiments of the present invention relate to communication technologies, and in particular, to a linkage policy implementation method and apparatus, an open platform board, and a device.

BACKGROUND

As an enterprise intranet develops constantly and more services run on the enterprise intranet, an access router (AR) serving as a switching device and a switch need to support more services. To support multiple services, the switching device in the conventional art is provided with an open platform board in addition to a main control board. The open platform board can provide diversified distinctive services. According to different service sources, the services may include a service customized by a switching device manufacturer, a third-party cooperative service, a user-developed service, and so on; and according to different service types, the services may include a network traffic analysis service, an antivirus service, and an application acceleration service. The above services additionally integrated into the switching device may be uniformly referred to as the third-party application services. The open platform board, in the form of a board, can conveniently add or remove the software of the third-party application services.

The third-party application services in the conventional art usually require the configuration of the main control board, which is mainly reflected in the form of linkage policy configuration. Taking the antivirus software as an example, when a third-party antivirus software detects that a service flow passing through the main control board carries a virus, the software may need to configure a linkage blocking policy or rule for the main control board, for example, instruct the main control board to block a port or a type of service flow.

To implement the linkage policy configuration of a third-party application service for the main control board, both the main control board and the open platform board on the switching device need to support the protocols used by the third-party application service, mainly including a network management protocol, or a man-machine command format, and so on. Different third-party application service providers may use different protocols, for example, the used network management protocol may be the Simple Network Management Protocol (SNMP) and Extensible Markup Language (XML).

Therefore, in the conventional art, it is required that the switching device should support multiple protocols. Accordingly, how to configure the switching device to support multiple protocols so as to implement the linkage policy configuration of the third-party application services while taking the configuration cost of hardware and software into account is a problem to be solved in the conventional art.

SUMMARY

Embodiments of the present invention provide a linkage policy implementation method and apparatus, an open platform board, and a device, so that a device is enabled to support multiple protocols with a low-cost optimized solution.

An embodiment of the present invention provides a linkage policy implementation method, including:

receiving, by a linkage proxy module, a linkage policy request delivered by a third-party application service;

calling, by the linkage proxy module, a corresponding protocol converter according to a protocol identifier in the linkage policy request, and performing protocol conversion for the linkage policy request to convert it into a linkage policy request in a set protocol format; and sending, by the linkage proxy module, the protocol-converted linkage policy request to a linkage client to instruct the linkage client to parse the linkage policy request based on the set protocol and execute linkage policy configuration.

An embodiment of the present invention provides a linkage proxy module, including:

a request receiving unit, configured to receive a linkage policy request delivered by a third-party application service;

a protocol converting unit, configured to call a corresponding protocol converter according to a protocol identifier in the linkage policy request, and perform protocol conversion for the linkage policy request to convert it into a linkage policy request in a set protocol format; and a linkage configuring unit, configured to send the protocol-converted linkage policy request to a linkage client to instruct the linkage client to parse the linkage policy request based on the set protocol and execute linkage policy configuration.

An embodiment of the present invention also provides an open platform board, including the linkage proxy module provided by any embodiment of the present invention.

An embodiment of the present invention also provides a device, including a main control board and an open platform board, where:

the open platform board is the open platform board provided by any embodiment of the present invention; and the main control board includes a linkage client, where the linkage client is configured to receive a linkage policy request delivered by the linkage proxy module, and parse the linkage policy request based on a set protocol and execute linkage policy configuration.

With the linkage policy implementation method and apparatus, the open platform board, and the device provided by the embodiments of the present invention, a linkage proxy module is arranged to execute protocol conversion of various protocols, which may isolate the linkage client based on the set protocol and multiple third-party application services executing different protocols. The linkage client may be integrated in a main control board or may interact with the main control board to implement the linkage policy configuration. On one hand, the linkage client may support only one protocol, and the cost of the linkage client would not be increased for supporting multiple protocols; on the other hand, when the third-party application services are increased or decreased, it is unnecessary to extend or update the linkage client.

When the embodiments of the present invention are applied to the device including a main control board and an open platform board, no impact is imposed on the software and hardware structures or the normal work of the main control board. Especially, when a protocol is added or updated, the main control board is not reconfigured, thereby avoiding interruption of work due to the restart of the main control board caused by reconfiguration. Therefore, both extensibility and compatibility of the device are improved, and the device can deploy a new third-party application service quickly without imposing impact on the main control board.

BRIEF DESCRIPTION OF THE DRAWINGS

FIG. 2A is a schematic structural diagram of a switching device that the first embodiment of the present invention is applicable to;

FIG. 2B is a schematic logical architecture diagram of an open platform board of the switching device that the first embodiment of the present invention is applicable to;

FIG. 8A, FIG. 8B, and FIG. 8C are thread diagrams of a linkage policy implementation method according to a seventh embodiment of the present invention;

DETAILED DESCRIPTION OF THE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
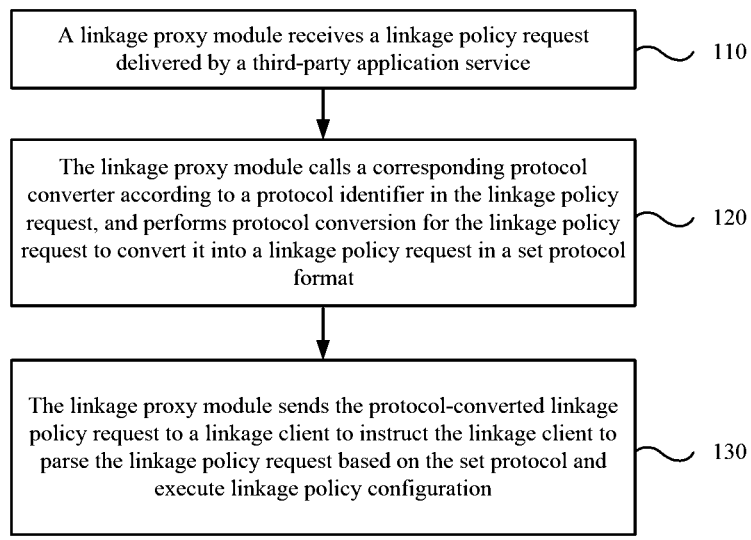
FIG. 1 is a flowchart of a linkage policy implementation method according to a first embodiment of the present invention.
Figure 2A:
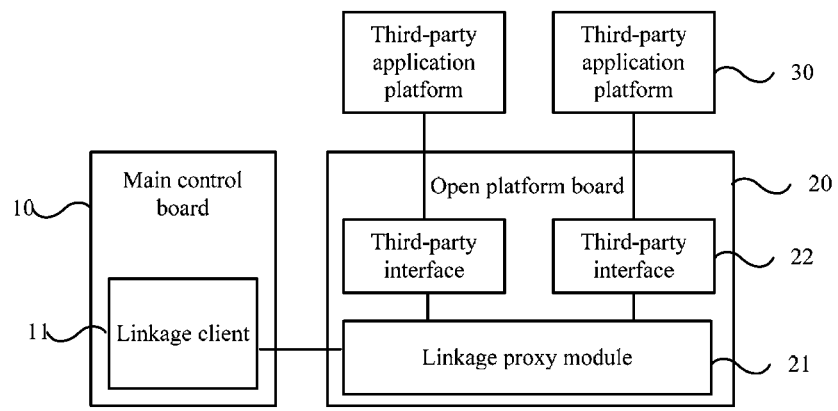

FIG. 1 is a flowchart of a linkage policy implementation method according to a first embodiment of the present invention. This embodiment may be applied to a device configured with a main control board and an open platform board, typically a switching device, for example, a router or a switch. Of course, the device may also include boards executing other functions. The technical solution of this embodiment is implemented by setting a linkage proxy on the open platform board of the switching device. The specific structure of network elements is shown in FIG. 2A. A linkage client 11 is set on a main control board 10, and a linkage proxy module 21 and a third-party interface 22 are set on an open platform board 20. There may be one or more third-party interfaces 22, which are respectively connected to providers of different third-party application services for data interaction, for example, connected to a third-party application platform 30. Multiple protocol converters are set in the linkage proxy module 21 to execute protocol conversion. Of course, the technical solution of this embodiment is not limited to the above switching device structure including the main control board and the open platform board, and may also be applicable to various network element systems requiring protocol isolation. The method of this embodiment is specifically described by using an example in which the method is performed by the linkage proxy module 21 in the open platform board 20. The method includes the following steps:

Step 110: A linkage proxy module receives a linkage policy request delivered by a third-party application service, and specifically, the linkage proxy module may receive the linkage policy request through a third-party interface.

The third-party interface set on the open platform board is preferably an software development kit (Software Development Kit, SDK) application programming interface (Application Programming Interface, API), and may be applicable to different protocols respectively. For example, the network management protocol may be a command line interface (Command Line Interface, CLI) protocol, an SNMP, a network configuration (Network Configuration, NETCONF) protocol, an "OpenFlow (open flow)" protocol, and so on. In step 110, preferably the linkage proxy module receives linkage policy requests delivered by different third-party application services through third-party interfaces corresponding to different protocols; the third-party application services using the same protocol can use the same third-party interface.

Step 120: The linkage proxy module calls a corresponding protocol converter according to a protocol identifier in the linkage policy request, and performs protocol conversion for the linkage policy request to convert it into a linkage policy request in a set protocol format.

Figure 2B:
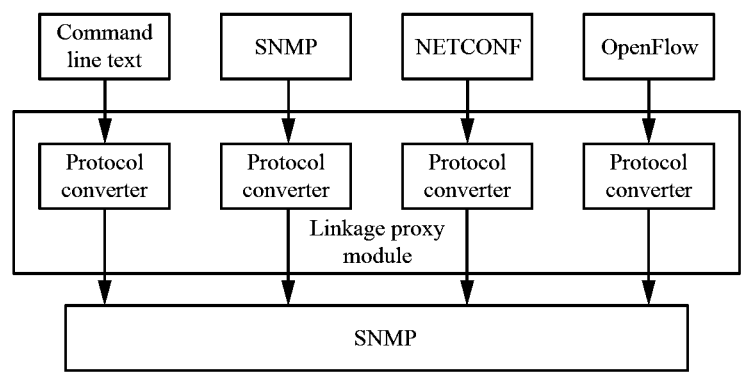

In step 120, the linkage proxy module may specifically search and call a protocol converter according to an interface type. Specifically, the linkage proxy module may collect an interface type in the linkage policy request, and use the interface type as the protocol identifier; the linkage proxy module queries, according to the interface type, a protocol converter global table for a corresponding protocol converter for calling. When the third-party interfaces correspond to different protocols, the interface type of the third-party interface receiving the linkage policy request corresponds to different protocols, based on which the corresponding protocol converter can be found. FIG. 2B is a schematic logical architecture diagram of an open platform board. Multiple protocol converters are set in the linkage proxy module of the open platform board, and correspond to different protocols. The protocol converter converts the linkage policy request based on a set protocol, where the set protocol is a protocol that is currently used by the main control board and is determined through interaction with the linkage proxy module, such as SNMP. Various protocol converters may respectively convert NETCONF, CLI, and OpenFlow protocols into the SNMP protocol. Of course, other protocol may also be determined as a set protocol according to requirements of the main control board, and the corresponding protocol convert is provided. The main work of a protocol converter is to convert the format of a linkage policy request according to the substance of the linkage policy request, so that the linkage policy request is in a format readable based on a set protocol. This embodiment is described by using conversion between various network management protocols as an example. However, those skilled in the art can understand that the protocol conversion in the actual application is not limited to conversion between various network management protocols.

Step 130: The linkage proxy module sends the protocol-converted linkage policy request to a linkage client to instruct the linkage client to parse the linkage policy request based on the set protocol and execute linkage policy configuration. With respect to the structure of a switching device, the linkage client may be integrated in a main control board, and in this case, this step may be specifically as follows: The linkage client directly controls the main control board to execute linkage policy configuration. Or, the linkage client may also be located outside the main control board, and parse the linkage policy request and execute linkage policy configuration through interaction with a control apparatus on the main control board.

The technical solution of this embodiment has many advantages. For example, compared with the solution in which multiple network management protocols are loaded on the main control board to support network management protocols of different third-party application services, the technical solution of this embodiment sets a linkage proxy on the open platform board of the device to execute protocol conversion, and may isolate the main control board based on a set network management protocol and multiple third-party application services executing different network management protocols. On one hand, the main control board may support only one network management protocol, and the cost of the main control board would not be increased for supporting multiple network management protocols; on the other hand, when third-party application services are increased or decreased, it is unnecessary to extend or update the main control board, and no impact would be imposed on the software and hardware structures and normal work of the main control board. Especially, when a network management protocol is added or updated, the main control board would not be reconfigured, thereby avoiding interruption of work due to restart of the main control board caused by reconfiguration. Therefore, both extensibility and compatibility of the device are improved, and the device can deploy a new third-party application service quickly without imposing impact on the main control board. This advantage is especially outstanding in the switching device.

Embodiment 2

Figure 3:
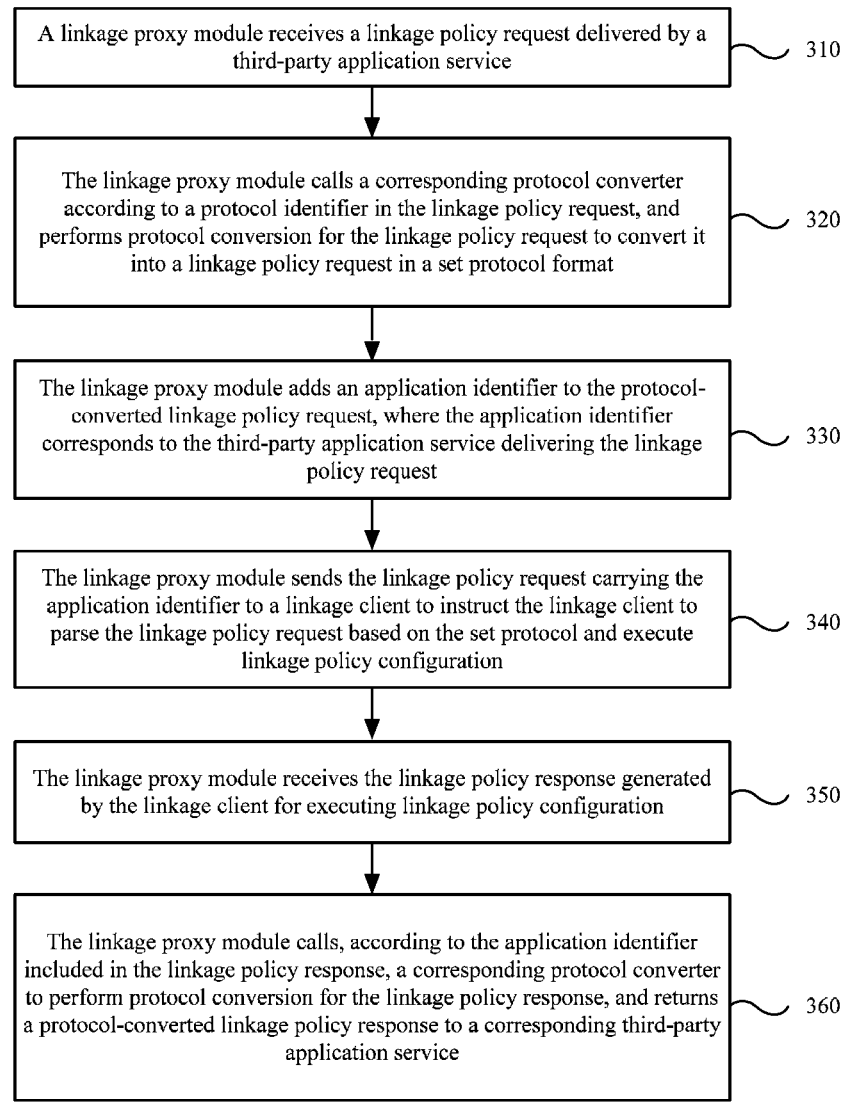
FIG. 3 is a flowchart of a linkage policy implementation method according to a second embodiment of the present invention.

FIG. 3 is a flowchart of a linkage policy implementation method according to a second embodiment of the present invention. This embodiment may further optimize, based on the first embodiment, the implementation method of the linkage proxy module in the linkage policy configuration process, and specifically include the following steps:

Step 310: A linkage proxy module receives a linkage policy request delivered by a third-party application service.

Step 320: The linkage proxy module calls a corresponding protocol converter according to a protocol identifier in the linkage policy request, and performs protocol conversion for the linkage policy request to convert it into a linkage policy request in a set protocol format.

Subsequently, in this embodiment, the linkage proxy module sending the protocol-converted linkage policy request to a linkage client to instruct the linkage client to parse the linkage policy request based on the set protocol and execute linkage policy configuration, which specifically includes the following steps:

Step 330: The linkage proxy module adds an application identifier to the protocol-converted linkage policy request, where the application identifier corresponds to the third-party application service delivering the linkage policy request.

The application identifier in the above step may be carried in the linkage policy request. However, preferably the linkage proxy module generates a corresponding application identifier for the third-party application service according to a predetermined algorithm, so that the linkage proxy module can identify the third-party application service.

Step 340: The linkage proxy module sends the linkage policy request carrying the application identifier to the linkage client to instruct the linkage client to parse the linkage policy request based on the set protocol and execute linkage policy configuration.

Step 350: The linkage proxy module receives a linkage policy response generated by the linkage client for executing linkage policy configuration, where the linkage policy response carries the application identifier.

Step 360: The linkage proxy module calls, according to the application identifier included in the linkage policy response, a corresponding protocol converter to perform protocol conversion for the linkage policy response, and returns a protocol-converted linkage policy response to a corresponding third-party application service.

In step 360, specifically the linkage proxy module may find the corresponding third-party application service based on the application identifier, and may further determine the corresponding third-party application platform and protocol identifier, and perform protocol conversion for the linkage policy response before returning it to the thread started by the third-party application service for subsequent processing.

This embodiment provides a technical solution for responding to the third-party linkage policy request. An application identifier corresponding to the third-party application service is added to the linkage policy request, so that the linkage client also carries the application identifier in the returned linkage policy response. The linkage proxy module may return the linkage policy response to the corresponding third-party application service according to the application identifier, specifically through a third-party interface, so that the third-party application service can know the state of progress of the linkage policy configuration.

In specific applications, the linkage policy generated and delivered by the third-party application service mainly includes two forms. One form is delivering a linkage parameter, and configuring the linkage parameter on the main control board to control the operation of the main control board. The other form is delivering a linkage event, where the linkage event configured for the main control board usually requires the main control board to monitor an event of interest and return an event notification message to the third-party application service when the event of interest occurs, so that the third-party application service is triggered to execute the set callback function.

For example, the antivirus application service is used as a third-party application service for description. The third-party application service may deliver a drain rule to a main control board of a switching device, where the drain rule is a linkage parameter, instructing the main control board of the switching device to mirror the received service flow to an intrusion detection system (Intrusion Detection System, IDS) antivirus application on the open platform board. Subsequently, the IDS antivirus application analyzes the service flow, and detects the service flow carrying a virus. The IDS antivirus application may deliver a linkage blocking policy/rule to the main control board through the open platform board according to the detection result, where the linkage blocking policy/rule may be in the form of a linkage parameter or in the form of a linkage event. For example, the linkage blocking policy may be a port number, instructing the main control board to block the service flow of the port number; when the linkage blocking policy being in the form of a linkage event, the linkage blocking policy may also be a port state, indicating that when the main control board monitors a change of the port state, that is, an event of interest, the event of interest is notified to the third-party application service, so that the third-party application service is triggered to execute a corresponding callback function, for example, to make a corresponding analysis.

The technical solution for returning a linkage policy response to the third-party application service in this embodiment may be respectively applicable to the form of delivering a linkage parameter and the form of delivering a linkage event. The linkage policy response may reflect whether the linkage parameter or event of interest is configured successfully, so that the third-party application service can know whether the linkage parameter is configured successfully.

Embodiment 3

Figure 4:
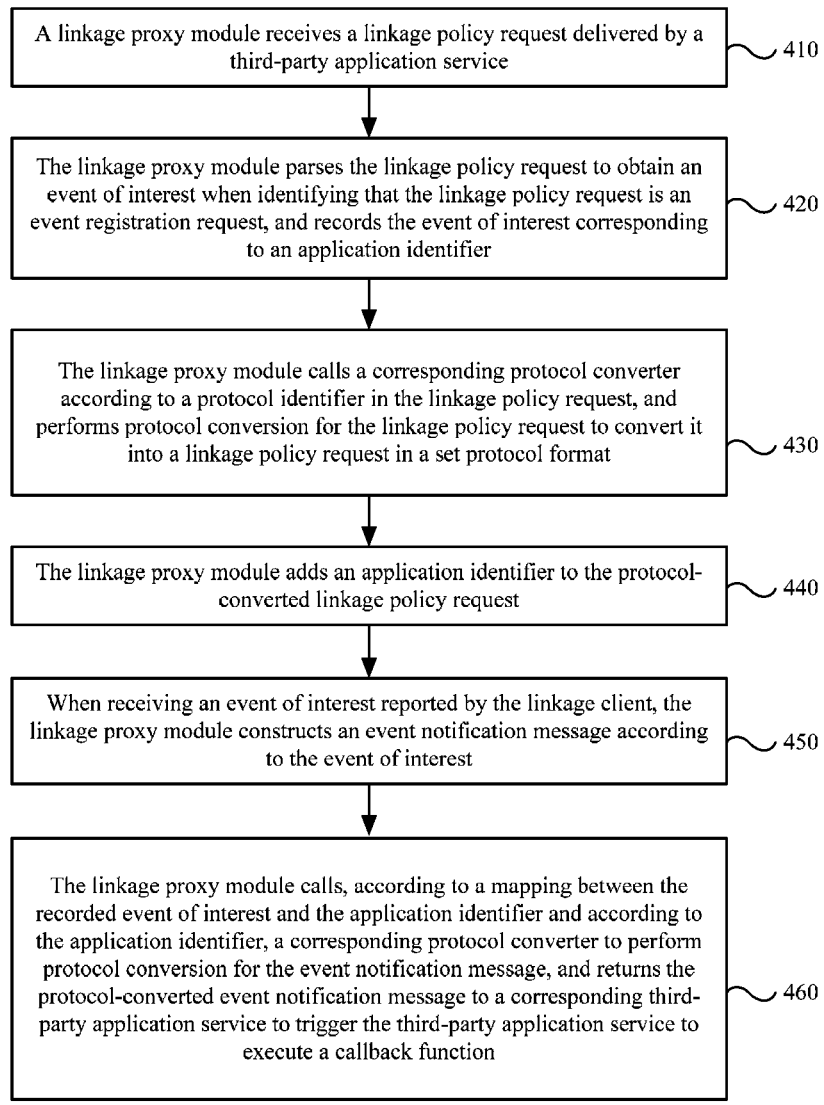
FIG. 4 is a flowchart of a linkage policy implementation method according to a third embodiment of the present invention.

FIG. 4 is a flowchart of a linkage policy implementation method according to a third embodiment of the present invention. This embodiment may be based on any embodiment above, and specifically, the linkage policy request is an event registration request. This embodiment includes the following steps:

Step 410: A linkage proxy module receives a linkage policy request delivered by a third-party application service.

Step 420: The linkage proxy module parses the linkage policy request to obtain an event of interest when identifying that the linkage policy request is an event registration request, and records the event of interest corresponding to an application identifier, where the application identifier corresponds to the third-party application service delivering the linkage policy request.

Step 430: The linkage proxy module calls a corresponding protocol converter according to a protocol identifier in the linkage policy request, and performs protocol conversion for the linkage policy request to convert it into a linkage policy request in a set protocol format.

Step 440: The linkage proxy module adds the application identifier to the protocol-converted linkage policy request.

Step 450: When receiving an event of interest reported by the linkage client, the linkage proxy module constructs an event notification message according to the event of interest.

Step 460: The linkage proxy module calls, according to a mapping between the recorded event of interest and the application identifier and according to the application identifier, a corresponding protocol converter to perform protocol conversion for the event notification message, and returns the protocol-converted event notification message to a corresponding third-party application service to trigger the third-party application service to execute a callback function.

This embodiment is applicable to the case of delivering a linkage event. The linkage proxy module constructs an event notification message and reports it to the third-party application service, so that the main control board notifies the third-party application service when the main control board monitors an event of interest. The specific execution process of delivering the linkage parameter and linkage event is described in detail through the subsequent embodiments.

On the basis of the above embodiment, before the linkage proxy module sends the protocol-converted linkage policy request to the linkage client, the following operation may be included: When identifying that the linkage policy request is an event deregistration request, the linkage proxy module clears the recorded event of interest corresponding to the application identifier.

Embodiment 4

Figure 5:
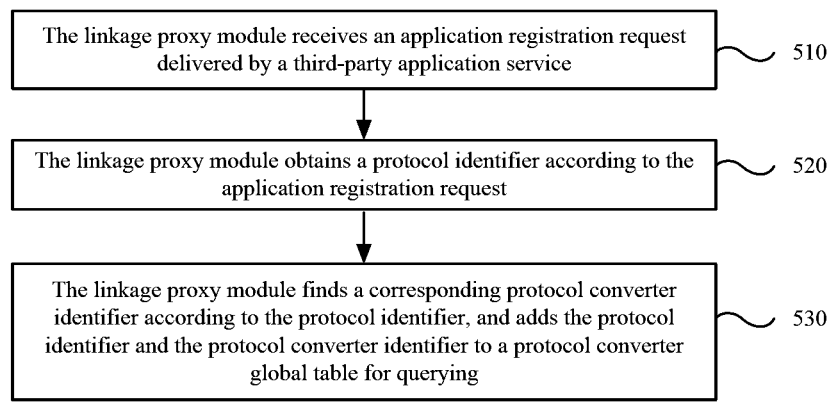
FIG. 5 is a flowchart of a linkage policy implementation method according to a fourth embodiment of the present invention.

FIG. 5 is a flowchart of a linkage policy implementation method according to a fourth embodiment of the present invention. This embodiment may be based on any embodiment above, and is specifically a solution for dynamically loading a protocol converter for a newly added third-party application service in the linkage proxy module of the open platform board. On the basis of the technical solution of the above embodiment, specifically the following steps are further included:

Step 510: A linkage proxy module receives an application registration request delivered by a third-party application service. No time sequence is specified for this step and the above technical solution. This step may be executed when, before, or after other third-party application service executes linkage policy configuration.

Step 520: The linkage proxy module obtains a protocol identifier according to the application registration request.

Step 530: The linkage proxy module finds a corresponding protocol converter identifier according to the protocol identifier, and adds the protocol identifier and the protocol converter identifier to a protocol converter global table for querying.

In the above technical solution, the protocol converter identifier is used to identify a protocol converter. For example, the protocol converter identifier may be a protocol converter program pointer, indicating the place from which the protocol converter is called. By adding an entry to the protocol converter global table, the newly added third-party application service can select a corresponding protocol converter, so that a corresponding protocol converter can be found for protocol conversion when a linkage policy request is delivered subsequently. The protocol converter global table stores a protocol identifier and a protocol converter identifier to facilitate finding of a protocol converter, but is not limited to the two entry contents.

The linkage proxy module may further obtain one or more application identifiers corresponding to the third-party application service from the application registration request, and correspondingly store the obtained application identifier and the protocol identifier and the protocol converter identifier in the protocol converter global table. Or, after the linkage proxy module receives the application registration request delivered by the third-party application service, the following is further included: The linkage proxy module generates an application identifier corresponding to the third-party application service delivering the application registration request, and correspondingly stores the generated application identifier and the protocol identifier and the protocol converter identifier in the protocol converter global table.

There may be multiple storage formats, for example, each application identifier corresponds to one entry, and therefore, each third-party application service may have multiple entries, as shown in Table 1, so as search is convenient. The entry content of the protocol converter global table may preferably include the service application name "App", application identifier, interface type, protocol converter program pointer, and so on.

TABLE 1

| Application Name | Application Identifier | API Type | Protocol Converter Program Pointer |
|---|---|---|---|
| App1 | 1 | api_type_A | Protocol converter 1 |
| App2 | 2 | api_type_B | Protocol converter 2 |
| Appn | n | api_type_N | Protocol converter n |

The technical solution of this embodiment is applicable to the case that a third-party application service is newly added, and can support dynamically loading a new third-party application service. The work of the linkage client or main control board is not affected when a new third-party application service is loaded. Therefore, the technical solution of this embodiment has good extensibility and can easily deploy third-party application services quickly. The linkage proxy module may record the protocol identifier corresponding to the third-party application service and the protocol converter identifier, for example, information such as an interface type and a program pointer, so that the corresponding protocol converter can be called when a linkage policy request delivered by the third-party application service is received. Further the application identifier of the third-party application service may be stored to indicate the interaction objects of the linkage policy request and response.

Correspondingly, when it is necessary to update or delete a third-party application service, or when an application identifier of the third-party application service needs to be updated or the third-party application service needs to be deleted, the entries of the protocol converter global table may also be updated and deleted through an application update request or an application deletion request.

Embodiment 5

Figure 6:
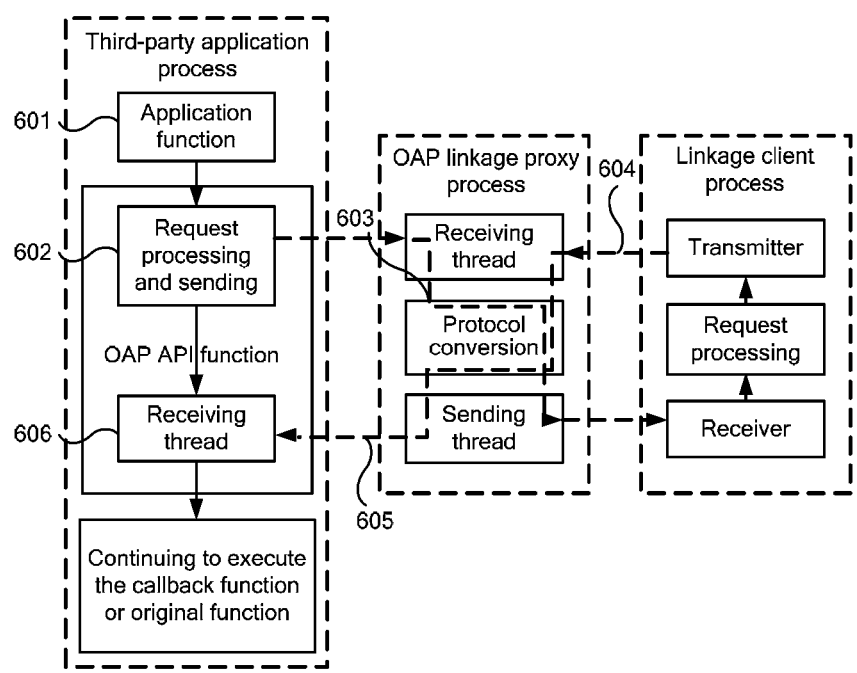
FIG. 6 is a thread diagram of a linkage policy implementation method according to a fifth embodiment of the present invention.

FIG. 6 is a thread diagram of a linkage policy implementation method according to a fifth embodiment of the present invention. The linkage proxy module may start a thread to implement the technical solutions of the above embodiments. This embodiment describes the execution process of the linkage policy implementation method from the perspective of the actual operation threads.

Step 601: An application function of a third-party application process, that is, a third-party application service, calls an OAP (open application platform, Open Application Platform) API function, and inputs a linkage parameter or callback function, thereby generating a linkage policy request.

Step 602: The OAP API function processes the linkage policy request, and sends the linkage policy request to an OAP linkage proxy process, that is, a linkage proxy module; and if the application function of the third-party application process needs to call the callback function, creates a corresponding receiving thread.

Step 603: The receiving thread in the linkage proxy process performs protocol conversion after receiving the linkage policy request, and sends the linkage policy request to the linkage client process on the main control board of the switching device.

Step 604: The linkage client process of the main control board of the switching device generates and sends a linkage policy response to the OAP linkage proxy process, where the linkage policy response may be a configuration success response, or may be a linkage event after an event is monitored.

Step 605: The receiving thread in the linkage proxy process performs protocol conversion after receiving the linkage policy response, and sends the linkage policy response to the OAP API function in the third-party application process.

Step 606: The OAP API function in the third-party application process is returned; the third-party application process continues to execute the original application function, or the receiving thread of the third-party application process executes the callback function after receiving an event notification message.

The technical solution of this embodiment specifically describes the coordination operation of each thread on the third-party application service, the linkage proxy module, and the linkage client. It can be seen that the protocol used by the third-party application service and the linkage client may be converted on the linkage proxy module, which basically has no impact on the solution executed by the third-party application service and linkage client.

Embodiment 6

Figure 7:
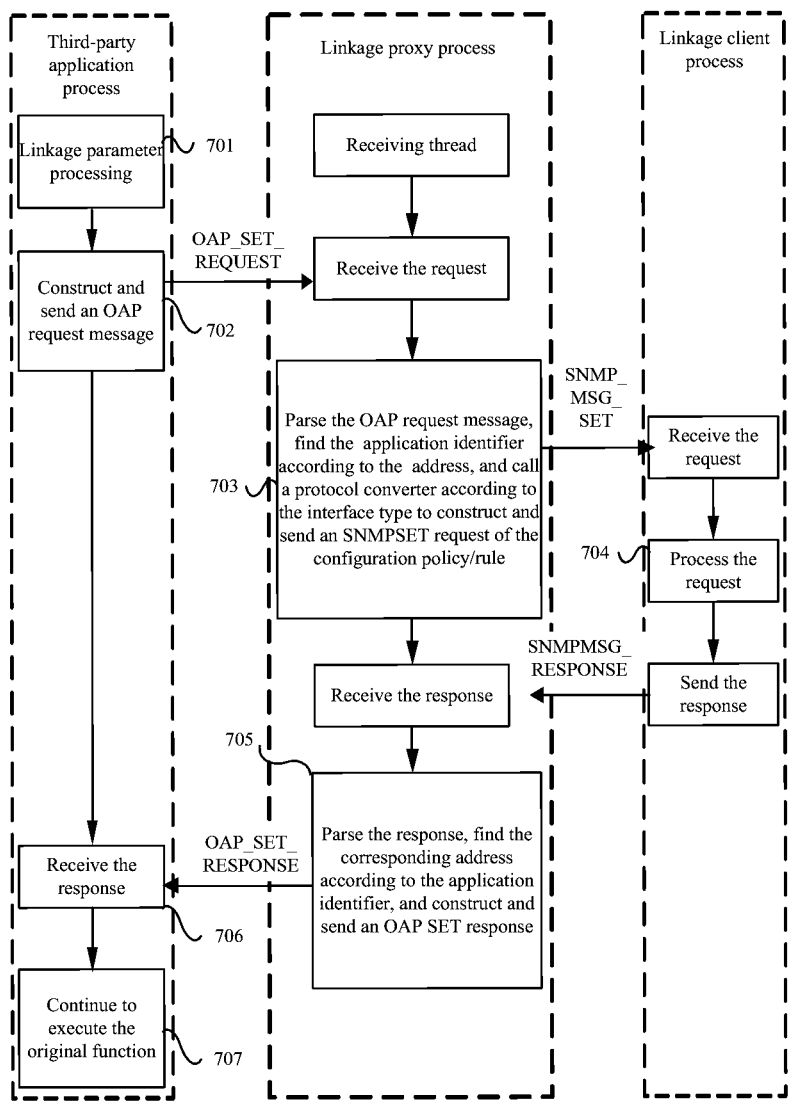
FIG. 7 is a thread diagram of a linkage policy implementation method according to a sixth embodiment of the present invention.

FIG. 7 is a thread diagram of a linkage policy implementation method according to a sixth embodiment of the present invention. This embodiment may be based on any embodiment above, and is specifically the linkage policy implementation method for processing a linkage parameter. In this embodiment, before sending the protocol-converted linkage policy request to a linkage client, the linkage proxy module continues to execute the operation of delivering the linkage policy request when identifying that the linkage type is a linkage parameter.

The following describes the procedure of the technical solution of this embodiment in detail by using an instance. The procedure includes the following steps:

Step 701: An application function in a third-party application process calls a linkage parameter processing API whose network management protocol is CLI, and inputs a linkage parameter in the corresponding protocol format.

Step 702: The linkage parameter processing API constructs an OAP request message "OAP_SET_REQUEST" request, that is, a linkage policy request, which carries the linkage parameter, and sends the linkage policy request to the linkage proxy process on the open platform board.

Step 703: The receiving thread in the linkage proxy process receives the "OAP_SET_REQUEST" request, parses the request message, finds the corresponding application identifier according to the source address in the request message, calls a corresponding protocol converter according to the interface type to construct an "SNMP_MSG_SET" request of the configuration policy/rule, that is, a protocol-converted linkage policy request, and sends the "SNMP_MSG_SET" request to the linkage client of the main control board.

Step 704: The linkage client process of the main control board receives the "SNMP_MSG_SET" request, processes the request, and sends an "SNMP_MSG_RESPONSE" response, that is, a linkage policy response, to the linkage proxy process.

Step 705: The receiving thread in the linkage proxy process receives the "SNMP_MSG_RESPONSE" response, parses the response, finds the corresponding address according to the application identifier, constructs an "OAP_SET_RE- SPONSE" response, that is, a protocol-converted linkage policy response, and sends it to the linkage parameter processing API.

Step 706: The linkage parameter processing API is returned after receiving the "OAP_SET_RESPONSE" response.

Step 707: The third-party application process calls the original application function of the linkage parameter processing API to continue execution.

The above process is an implementation method for executing the linkage policy in the form of a linkage parameter, where the form of a linkage parameter includes but is not limited to: a port number, an access control list, a source address, a destination address, a control policy rule, and so on.

Embodiment 7

Figure 8A:
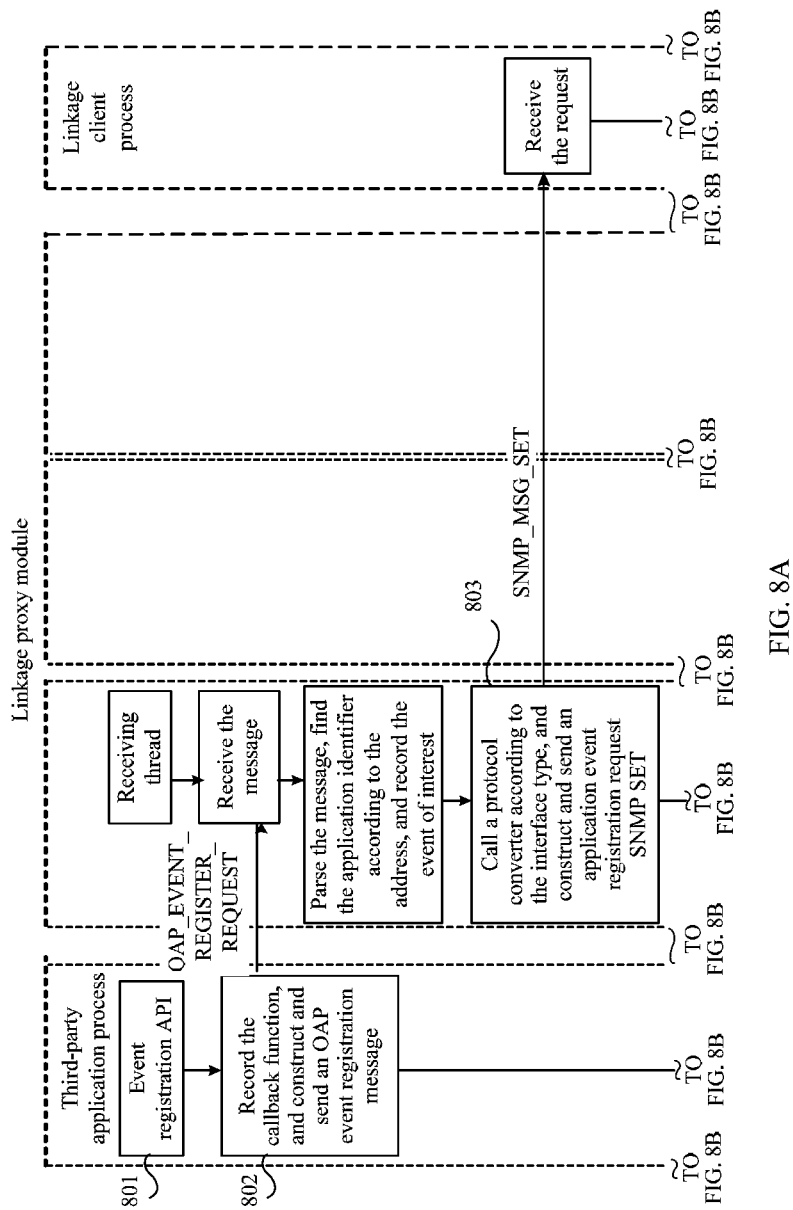
Figure 8B:
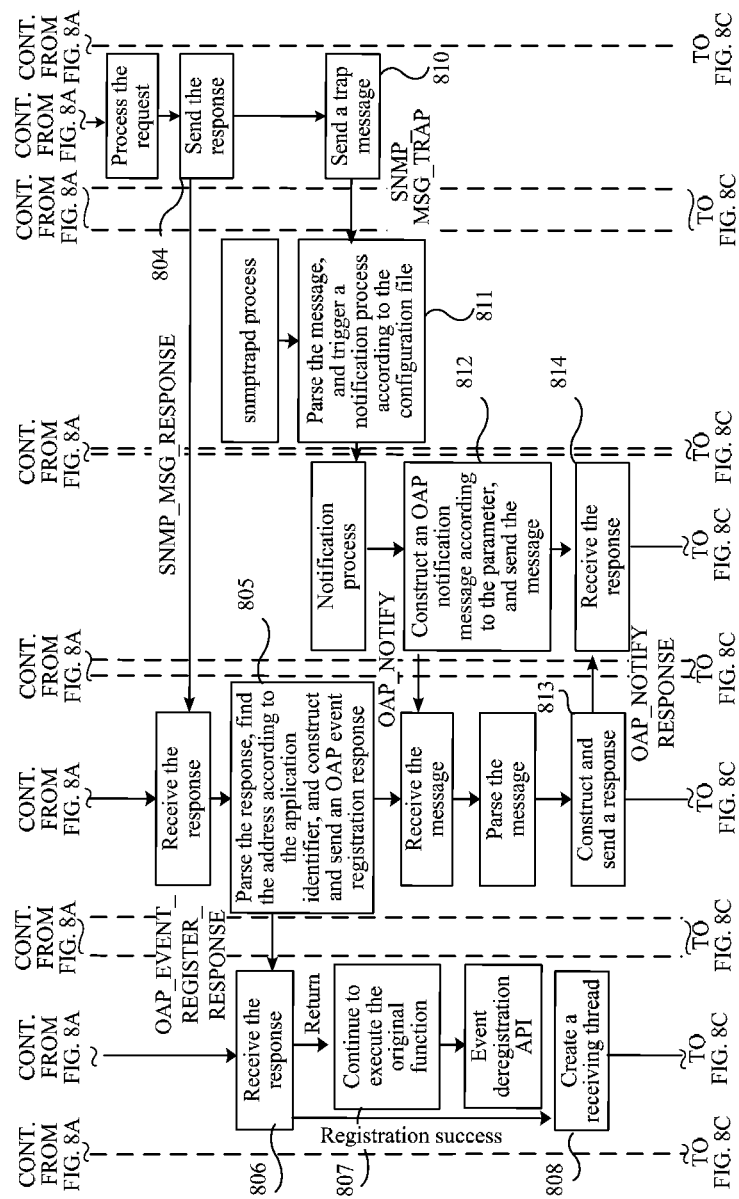

FIG. 8A, FIG. 8B, and FIG. 8C are thread diagrams of a linkage policy implementation method according to a seventh embodiment of the present invention. This embodiment may be based on any embodiment above, and is specifically the linkage policy implementation method for processing a linkage event.

The linkage proxy module may start multiple threads to execute the above process, which specifically includes the following steps:

Step 801: An application function in a third-party application process calls an event registration API, and inputs an event of interest and the identifier of a callback function to be triggered after the event occurs, for example, uses the change of a port state as the event of interest.

Step 802: The event registration API records the callback function, constructs an OAP event registration message "OAP_EVENT_REGISTER_REQUEST", that is, a linkage policy request, and sends it to the linkage proxy process.

Step 803: The receiving thread in the linkage proxy process receives the "OAP_EVENT_REGISTER_REQUEST" message, parses the message, finds the corresponding application identifier according to the address, and records the event of interest, for example, records the port number of each port, the state change of which is of interest, then calls the corresponding protocol converter according to the interface type to construct an application event registration request "SNMP_MSG_SET", that is, a protocol-converted linkage policy request, and sends it to the linkage client process.

Step 804: The linkage client process receives the "SNMP_MSG_SET" request, processes the request, and sends an "SNMP_MSG_RESPONSE" response, that is, a linkage policy response, to the linkage proxy process, notifying that the event registration is successful.

Step 805: The receiving thread in the linkage proxy process receives the "SNMP_MSG_RESPONSE" response, parses the response, finds the corresponding address according to the application identifier, constructs an OAP event registration response "OAP_EVENT_REGISTER_RESPONSE", that is, a protocol-converted linkage policy response, and sends it to the event registration API.

Step 806: The event registration API receives the "OAP_EVENT_REGISTER_RESPONSE" response, and analyzes whether the registration result is successful; if the registration fails, step 807 is executed, or if the registration is successful, step 808 is executed.

Step 807: The event registration API is returned, and the third-party application process calls the application function of the linkage event registration API to continue execution, and the procedure is ended.

Step 808: The event registration API creates a receiving thread, and waits for the event notification message sent by the linkage proxy.

Step 809: The event registration API is returned; the third-party application process calls the application function of the linkage event registration API to continue execution, and then step 810 is executed; when the application process is no longer concerned about the event or before the process is terminated, an event deregistration API is called.

Step 810: The linkage client process sends an "SNMP_MSG_TRAP" notification message to the linkage proxy process to report the event of interest after detecting that the event of interest registered by the third-party application process occurs.

Step 811: The "snmptrapd" process in the linkage proxy module receives the "SNMP_MSG_TRAP" notification message, parses the message, and triggers the notification process according to a predetermined configuration file, where the "snmptrapd" process is started and executed when the linkage proxy process is started initially, for triggering the notification process.

Step 812: The notification process of the linkage proxy module constructs an OAP notification message "OAP_NOTIFY" that is, an event notification message, according to the parameter in the configuration file and the parameter in the event of interest, and sends the OAP notification message "OAP_NOTIFY" to the receiving thread in the linkage proxy.

Step 813: The receiving thread in the linkage proxy process receives the "OAP_NOTIFY" notification message, parses the message, constructs an "OAP_NOTIFY_RESPONSE" response, and sends the response to the notification process.

Step 814: The notification process stops running after receiving the "OAP_NOTIFY_RESPONSE" response.

Step 815: The receiving thread in the linkage proxy process constructs a protocol-converted "OAP_NOTIFY" notification message, and sends the event notification message to the corresponding third-party application service according to identifiers such as the application identifier.

Step 816: The receiving thread created by the event registration API receives the "OAP_NOTIFY" notification message, parses the message, and constructs and sends an event notification response to the linkage proxy process, so that the linkage proxy process receives the "OAP_NOTIFY_RESPONSE" response.

Step 817: The receiving thread created by the event registration API executes the callback function input when the third-party application process is registered, and the above steps 810 to 817 are executed repeatedly, so that an event of interest is processed once it occurs.

Embodiment 8

Figure 9:
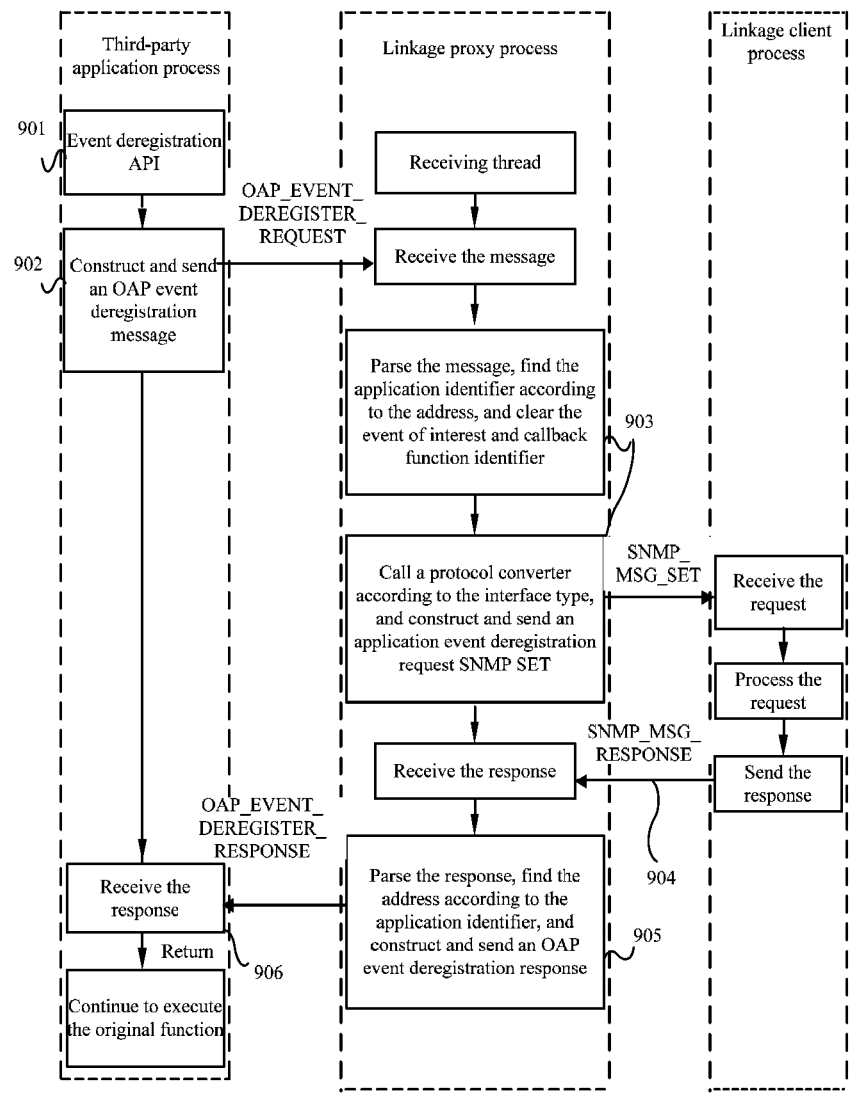
FIG. 9 is a thread diagram of a linkage policy implementation method according to an eighth embodiment of the present invention.

FIG. 9 is a thread diagram of a linkage policy implementation method according to an eighth embodiment of the present invention. This embodiment is based on the seventh embodiment. Before the linkage proxy module sends a protocol-converted linkage policy request to a linkage client, and when the linkage proxy module identifies that the linkage policy request is an event deregistration request, the linkage proxy module further clears the recorded event of interest corresponding to the application identifier. This embodiment specifically describes an event deregistration procedure in the linkage policy implementation method of the linkage event. The procedure includes the following steps:

Step 901: An application function in a third-party application process calls an event deregistration API, and inputs an event of interest and a callback function.

Step 902: The event deregistration API constructs an OAP event deregistration message "OAP_EVENT_DEREGISTER_REQUEST" request, that is, a linkage policy request, and sends the "OAP_EVENT_DEREGISTER_REQUEST" request to the linkage proxy process.

Step 903: The receiving thread in the linkage proxy process receives the "OAP_EVENT_DEREGISTER_REQUEST" request, parses the request, finds the corresponding application identifier according to the address, clears the recorded event of interest corresponding to the application identifier from the linkage proxy, calls the corresponding protocol converter according to the interface type to construct a "SNMP_MSG_SET" request of the event deregistration, and sends the "SNMP_MSG_SET" request to the linkage client of the main control board.

Step 904: The linkage client process receives the "SNMP_MSG_SET" request, processes the request, and sends an "SNMP_MSG_RESPONSE" response to the linkage proxy process.

Step 905: The receiving thread in the linkage proxy process receives the "SNMP_MSG_RESPONSE" response, parses the response, finds the corresponding address according to the application identifier, constructs an OAP event deregistration response "OAP_EVENT_DEREGISTER_RESPONSE", and sends the OAP event deregistration response "OAP_EVENT_DEREGISTER_RESPONSE" to the event deregistration API.

Step 906: The event deregistration API is returned after receiving the "OAP_EVENT_DEREGISTER_RESPONSE" response, and the third-party application process calls the application function of the linkage event registration API to continue execution.

The technical solution of this embodiment can conveniently implement the linkage policy configuration of the linkage event. With the technical solutions of the seventh embodiment and eighth embodiment, the linkage proxy module records the event of interest and constructs an event notification message. Therefore, the linkage event is mainly configured and updated by the linkage proxy module arranged on the open platform board, which reduces the impact on normal work of the linkage client or main control board.

Embodiment 9

Figure 10:
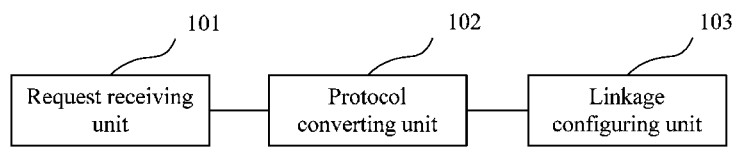
FIG. 10 is a schematic structural diagram of a linkage proxy module according to a ninth embodiment of the present invention.

FIG. 10 is a schematic structural diagram of a linkage proxy module according to a ninth embodiment of the present invention. The linkage proxy module includes: a request receiving unit 101, a protocol converting unit 102, and a linkage configuring unit 103. The request receiving unit 101 is configured to receive a linkage policy request delivered by a third-party application service; the protocol converting unit 102 is configured to call a corresponding protocol converter according to a protocol identifier in the linkage policy request, and perform protocol conversion for the linkage policy request to convert it into a linkage policy request in a set protocol format; and the linkage configuring unit 103 is configured to send the protocol-converted linkage policy request to a linkage client to instruct the linkage client to parse the linkage policy request based on the set protocol and execute linkage policy configuration.

The technical solution of this embodiment of the present invention sets a linkage proxy to execute protocol conversion of various protocols, and may isolate the linkage client based on the set protocol and multiple third-party application services executing different protocols. The linkage client may be integrated in a main control board or may interact with the main control board to implement linkage policy configuration. On one hand, the linkage client may support only one protocol, and the cost of the linkage client would not be increased for supporting multiple protocols; on the other hand, when third-party application services are increased or decreased, it is unnecessary to extend or update the linkage client.

The linkage proxy module provided by each embodiment of the present invention may execute the linkage policy implementation method provided by the embodiment of the present invention, and has the corresponding functional modules.

Embodiment 10

Figure 11:
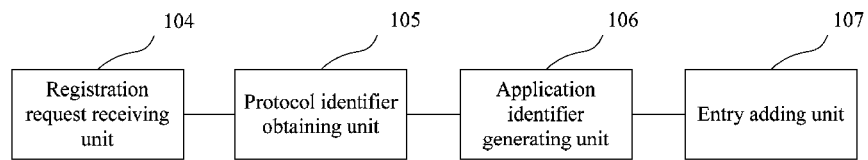
FIG. 11 is a schematic structural diagram of a linkage proxy module according to a tenth embodiment of the present invention.

FIG. 11 is a schematic structural diagram of a linkage proxy module according to a tenth embodiment of the present invention. This embodiment may be based on the ninth embodiment. Preferably, the linkage proxy module further includes: a registration request receiving unit 104, a protocol identifier obtaining unit 105, an application identifier generating unit 106, and an entry adding unit 107. The registration request receiving unit 104 is configured to receive an application registration request delivered by a third-party application service; the protocol identifier obtaining unit 105 is configured to obtain a protocol identifier according to the application registration request; the application identifier generating unit 106 is configured to generate an application identifier for the third-party application service delivering the application registration request; and the entry adding unit 107 is configured to find a corresponding protocol converter identifier according to the protocol identifier, and add the application identifier, the protocol identifier, and the protocol converter identifier to a protocol converter global table for querying. The protocol converter global table may be provided for the protocol converting unit to query.

The technical solution of this embodiment may implement dynamic loading of a third-party application service on the linkage proxy module.

Embodiment 11

Figure 12:
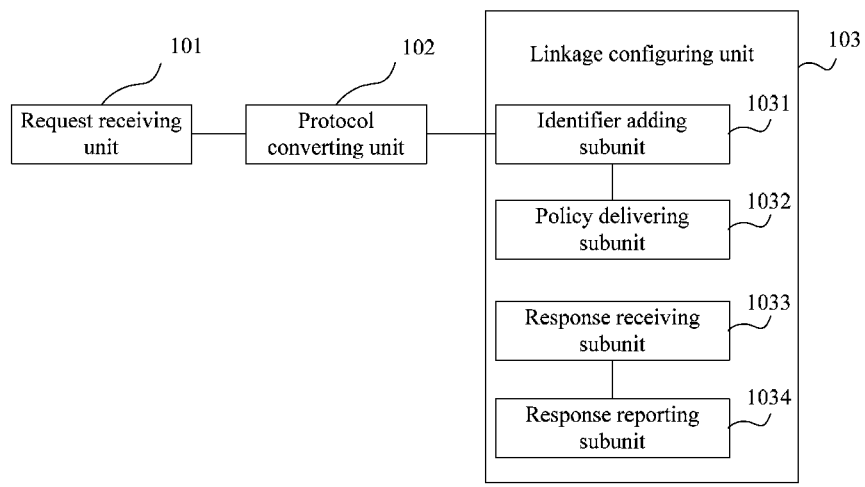
FIG. 12 is a schematic structural diagram of a linkage proxy module according to an eleventh embodiment of the present invention.

FIG. 12 is a schematic structural diagram of a linkage proxy module according to an eleventh embodiment of the present invention. This embodiment may be based on the above embodiments. Preferably, the linkage configuring unit 103 includes: an identifier adding subunit 1031, a policy delivering subunit 1032, a response receiving subunit 1033, and a response reporting subunit 1034. The identifier adding subunit 1031 is configured to add an application identifier to the protocol-converted linkage policy request, where the application identifier corresponds to the third-party application service delivering the linkage policy request; the policy delivering subunit 1032 is configured to send the linkage policy request carrying the application identifier to the linkage client to instruct the linkage client to parse the linkage policy request based on the set protocol and execute linkage policy configuration; the response receiving subunit 1033 is configured to receive a linkage policy response generated by executing linkage policy configuration by the linkage client; and the response reporting subunit 1034 is configured to call, according to an application identifier included in the linkage policy response, a corresponding protocol converter to perform protocol conversion for the linkage policy response, and return the protocol-converted linkage policy response to a corresponding third-party application service.

This embodiment provides a technical solution for responding to the third-party linkage policy request. By adding an application identifier corresponding to the third-party application service to the linkage policy request, the linkage client also carries the application identifier in the returned linkage policy response, and the linkage proxy module may return the linkage policy response to the corresponding third-party application service according to the application identifier.

Embodiment 12

Figure 13:
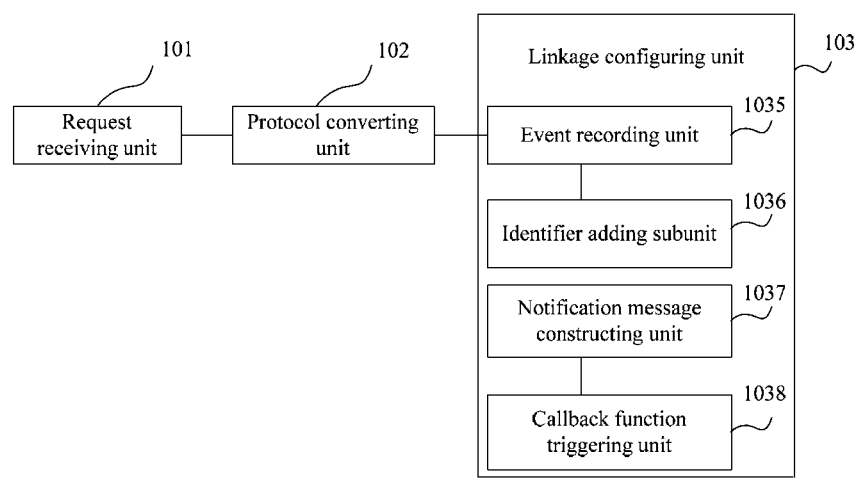
FIG. 13 is a schematic structural diagram of a linkage proxy module according to a twelfth embodiment of the present invention.

FIG. 13 is a schematic structural diagram of a linkage proxy module according to a twelfth embodiment of the present invention. This embodiment may be based on the above embodiments. Preferably, the linkage configuring unit 103 specifically includes: an event recording unit 1035, an identifier adding subunit 1036, a notification message constructing unit 1037, and a callback function triggering unit 1038. The event recording unit 1035 is configured to: before the protocol-converted linkage policy request is sent to the linkage client and when the linkage proxy module identifies that the linkage policy request is an event registration request, parse the linkage policy request to obtain an event of interest, and record the event of interest corresponding to an application identifier, where the application identifier corresponds to the third-party application service delivering the linkage policy request; the identifier adding subunit 1036 is configured to add the application identifier to the protocol-converted linkage policy request; the notification message constructing unit 1037 is configured to: when the linkage proxy module receives an event of interest reported by the linkage client, construct an event notification message according to the event of interest; and the callback function triggering unit 1038 is configured to call, according to a mapping between the recorded event of interest and the application identifier, and according to the application identifier, a corresponding protocol converter to perform protocol conversion for the event notification message, and return a protocol-converted event notification message to a corresponding third-party application service to trigger the third-party application service to execute a callback function.

This embodiment is applicable to the case of delivering a linkage event. The linkage proxy module constructs an event notification message and reports it to the third-party application service, so that the linkage client notifies the monitored event of interest to the third-party application service.

An embodiment of the present invention also provides an open platform board, including the linkage proxy module provided by any embodiment of the present invention. The open platform board preferably further includes: multiple third-party interfaces corresponding to different protocols, configured to implement interaction between the third-party application service and the linkage proxy module, where the third-party interfaces are application programming interfaces of a software development kit, and the protocol identifier is an interface type.

An embodiment of the present invention also provides a device, including a main control board and an open platform board, the structures of which may be as shown in FIG. 2A. The open platform board 20 is the open platform board 20 provided by any embodiment of the present invention; the main control board 10 includes a linkage client 11, where the linkage client 11 is configured to receive a linkage policy request delivered by the linkage proxy module 21, and parse the linkage policy request based on a set protocol and execute linkage policy configuration.

Typically the device including the main control board and open platform board is a switching device. The technical solution of the embodiment of the present invention does not impose any impact on the software and hardware structures and normal work of the main control board. Especially, when a protocol is added or updated, the main control board is not reconfigured, thereby avoiding interruption of work due to restart of the main control board caused by reconfiguration. Therefore, both extensibility and compatibility of the device are improved, and the device can deploy a new third-party application service quickly without imposing impact on the main control board.

Persons of ordinary skill in the art may understand that all or a part of the steps of the methods in the embodiments may be implemented by a program instructing relevant hardware. The program may be stored in a computer readable storage medium. When the program runs, the steps of the methods in the embodiments are performed. The storage medium may be any medium that is capable of storing program codes, such as a ROM, a RAM, a magnetic disk, or an optical disk.

Finally, it should be noted that the above embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A linkage policy implementation method applied in a device configured with a main control board and an open platform board, wherein the open platform board comprising a linkage proxy module, the linkage policy implementation method performed by the linkage proxy module, comprising:
    receiving an application registration request delivered by a third-party application service;
    obtaining a protocol identifier according to the application registration request;
    obtaining a corresponding protocol converter identifier according to the obtained protocol identifier, and adding the obtained protocol identifier and the corresponding protocol converter identifier to a protocol converter global table;
    receiving a first linkage policy request delivered by the third-party application service, wherein the first linkage policy request is in a format of a first protocol, the first protocol format that is currently used by the third-party application service;
    calling a corresponding protocol converter according to a first protocol identifier in the first linkage policy request, and performing a protocol conversion for the first linkage policy request to convert the first linkage policy request into a second linkage policy request in a format of a second protocol, wherein the second protocol format that is currently used by the main control board; and
    sending the protocol-converted second linkage policy request to a linkage client integrated in the main control board, to instruct the linkage client to parse the second linkage policy request based on the second protocol format and execute linkage policy configuration;
    wherein sending the protocol-converted second linkage policy request to the linkage client to instruct the linkage client to parse the second linkage policy request based on the second protocol format and execute the linkage policy configuration comprises:

adding the application identifier to the protocol-converted second linkage policy request, wherein the application identifier corresponds to the third-party application service;

sending the second linkage policy request carrying the corresponding application identifier to the linkage client to instruct the linkage client to parse the second linkage policy request based on the second protocol format and execute the linkage policy configuration;

receiving a linkage policy response generated by the linkage client for executing the linkage policy configuration; and calling, according to the corresponding application identifier comprised in the linkage policy response, the corresponding protocol converter to perform the protocol conversion for the linkage policy response, and returning the corresponding protocol-converted linkage policy response to the corresponding third-party application service.

2. The linkage policy implementation method according to claim 1, wherein after the linkage proxy module receives the application registration request delivered by the third-party application service, the method further comprises:

generating the corresponding application identifier for the third-party application service delivering the application registration request, and correspondingly storing the generated corresponding application identifier, the obtained protocol identifier and the corresponding protocol converter identifier in the protocol converter global table.

3. The linkage policy implementation method according to claim 1, wherein the corresponding protocol converter identifier is a protocol converter program pointer.

4. The linkage policy implementation method according to claim 1, wherein the receiving the first linkage policy request delivered by the third-party application service comprises:

receiving, through a third-party interface corresponding to a different format of the first protocol format, the first linkage policy request delivered by the third-party application service.

5. The linkage policy implementation method according to claim 4, wherein the calling, by the linkage proxy module, the corresponding protocol converter according to the first protocol identifier in the first linkage policy request comprises:

collecting an interface type in the first linkage policy request, and using the interface type as the first protocol identifier; and querying, according to the collected interface type, the protocol converter global table for the corresponding protocol converter for calling.

6. The linkage policy implementation method according to claim 1, wherein the first linkage policy request is an event registration request, and before the linkage proxy module sends the protocol-converted second linkage policy request to the linkage client, the method further comprises:

parsing the first linkage policy request to obtain an event of interest, and recording the obtained event of interest corresponding to the corresponding application identifier; and after sending the protocol-converted second linkage policy request to the linkage client to instruct the linkage client to parse the second linkage policy request based on the second protocol format and execute the linkage policy configuration, the method further comprises:

when receiving the recorded event of interest reported by the linkage client, constructing an event notification message according to the recorded event of interest; and calling, according to a mapping between the recorded event of interest and the corresponding application identifier, and according to the corresponding application identifier, the corresponding protocol converter to perform the protocol conversion for the constructed event notification message, and returning the protocol-converted event notification message to the corresponding third-party application service to trigger the third-party application service to execute a callback function.

7. The linkage policy implementation method according to claim 6, the method further comprises:

when the linkage proxy module receives an event deregistration request, wherein the event deregistration request comprises the recorded event of interests, clearing the recorded event of interest corresponding to the corresponding application identifier.

8. A linkage proxy module, comprising: one or more processors coupled to a memory; wherein the memory storing processor-executable instructions, and the processor-executable instructions when executed causes the one or more processors to perform a process that comprises:

receiving an application registration request delivered by a third-party application service;

obtaining a protocol identifier according to the application registration request;

obtaining a corresponding protocol converter identifier according to the obtained protocol identifier, and adding the obtained protocol identifier and the corresponding protocol converter identifier to a protocol converter global table;

receiving a first linkage policy request delivered by the third-party application service, wherein the first linkage policy request is in a format of a first protocol, the first protocol format that is currently used by the third-party application service;

calling a corresponding protocol converter according to a first protocol identifier in the first linkage policy request, and performing a protocol conversion for the first linkage policy request to convert the first linkage policy request into a second linkage policy request in a format of a second protocol, wherein the second protocol format that is currently used by the main control board;

sending the protocol-converted second linkage policy request to a linkage client integrated in the main control board, to instruct the linkage client to parse the second linkage policy request based on the second protocol and execute a linkage policy configuration;

wherein when sending the protocol-converted second linkage policy request to the linkage client to instruct the linkage client to parse the second linkage policy request based on the second protocol format and execute the linkage policy configuration, the processing hardware executes the instructions to perform:

adding an application identifier to the protocol-converted second linkage policy request, wherein the application identifier corresponds to the third-party application service;

sending the second linkage policy request carrying the corresponding application identifier to the linkage client to instruct the linkage client to parse the second linkage policy request based on the second protocol format and execute the linkage policy configuration;

receiving a linkage policy response generated by the linkage client for executing the linkage policy configuration; and calling, according to the corresponding application identifier comprised in the linkage policy response, the corresponding protocol converter to perform the protocol conversion for the generated linkage policy response, and returning the corresponding protocol-converted linkage policy response to the corresponding third-party application service.

9. The linkage proxy module according to claim 8, wherein after the linkage proxy module receives the application registration request delivered by the third-party application service, the processing hardware executes the instructions to further perform:

generating the corresponding application identifier for the third-party application service, and correspondingly storing the generated corresponding application identifier, the obtained protocol identifier and the corresponding protocol converter identifier in the protocol converter global table.

10. The linkage proxy module according to claim 8, wherein the first linkage policy request is an event registration request, and before the protocol-converted second linkage policy request is sent to the linkage client, the processing hardware executes the instructions to perform:

parsing the first linkage policy request to obtain an event of interest, and record the event of interest corresponding to the corresponding application identifier;

after sending the protocol-converted second linkage policy request to the linkage client to instruct the linkage client to parse the second linkage policy request based on the second protocol format and execute the linkage policy configuration, the process further comprises:

constructing an event notification message according to the recorded event of interest when the linkage proxy module receives the recorded event of interest reported by the linkage client; and calling, according to a mapping between the recorded event of interest and the corresponding application identifier, and according to the corresponding application identifier, the corresponding protocol converter to perform the protocol conversion for the constructed event notification message, and returning the protocol-converted event notification message to the corresponding third-party application service to trigger the third-party application service to execute a callback function.

11. A device, comprising a main control board and an open platform board, the open platform board comprises a linkage proxy module; wherein the linkage proxy module comprises a processing hardware executing instructions stored on a non-transitory computer-readable storage medium to perform a process that comprises:

receiving an application registration request delivered by a third-party application service;

obtaining a protocol identifier according to the application registration request;

obtaining a corresponding protocol converter identifier according to the obtained protocol identifier, and adding the obtained protocol identifier and the corresponding protocol converter identifier to a protocol converter global table;

receiving a first linkage policy request delivered by the third-party application service, wherein the first linkage policy request is in a format of a first protocol, the first protocol format that is currently used by the third-party application service;

calling a corresponding protocol converter according to a first protocol identifier in the first linkage policy request, and performing a protocol conversion for the first linkage policy request to convert the first linkage policy request into a second linkage policy request in a format of a second protocol, wherein the second protocol format that is currently used by the main control board;

sending the protocol-converted second linkage policy request to a linkage client integrated in the main control board, to instruct the linkage client to parse the second linkage policy request based on the second protocol format and execute a linkage policy configuration;

wherein when sending the protocol-converted second linkage policy request to the linkage client to instruct the linkage client to parse the second linkage policy request based on the second protocol format and execute the linkage policy configuration, the processing hardware executes the instructions to perform:

adding an application identifier to the protocol-converted second linkage policy request, wherein the application identifier corresponds to the third-party application service;

sending the second linkage policy request carrying the corresponding application identifier to the linkage client to instruct the linkage client to parse the second linkage policy request based on the second protocol format and execute the linkage policy configuration;

receiving a linkage policy response generated by the linkage client for executing the linkage policy configuration; and calling, according to the corresponding application identifier comprised in the linkage policy response, the corresponding protocol converter to perform the protocol conversion for the generated linkage policy response, and returning the corresponding protocol-converted linkage policy response to the corresponding third-party application service.

12. The device according to claim 11, wherein the first linkage policy request is an event registration request, and before the protocol-converted second linkage policy request is sent to the linkage client, the processing hardware executes the instructions to perform:

parsing the first linkage policy request to obtain an event of interest, and record the event of interest corresponding to the corresponding application identifier;

after sending the protocol-converted second linkage policy request to the linkage client to instruct the linkage client to parse the second linkage policy request based on the second protocol format and execute the linkage policy configuration, the process further comprises:

constructing an event notification message according to the recorded event of interest when the linkage proxy module receives the recorded event of interest reported by the linkage client; and calling, according to a mapping between the recorded event of interest and the corresponding application identifier, and according to the corresponding application identifier, the corresponding protocol converter to perform the protocol conversion for the constructed event notification message, and returning the protocol-converted event notification message to the corresponding third-party application service to trigger the third-party application service to execute a callback function.

* * * * *